United States Patent [19]

Shibata

[11] Patent Number: 5,738,563
[45] Date of Patent: Apr. 14, 1998

[54] SUBSTRATE CHAMFERING MACHINE

[75] Inventor: Manabu Shibata, Ichikai-machi, Japan

[73] Assignee: Kao Corporation, Tokyo, Japan

[21] Appl. No.: 737,139

[22] PCT Filed: Feb. 20, 1996

[86] PCT No.: PCT/JP96/00380

§ 371 Date: Nov. 7, 1996

§ 102(e) Date: Nov. 7, 1996

[87] PCT Pub. No.: WO96/27479

PCT Pub. Date: Sep. 12, 1996

[30] Foreign Application Priority Data

Mar. 7, 1995 [JP] Japan ................ 7-072512

[51] Int. Cl.$^6$ .................................... B24B 49/00
[52] U.S. Cl. .................. 451/5; 451/6; 451/43; 451/44; 451/256
[58] Field of Search ............... 457/5, 43, 44, 457/254–256, 63, 6

[56] References Cited

U.S. PATENT DOCUMENTS

| | | | |
|---|---|---|---|
| 5,295,331 | 3/1994 | Honda et al. | 451/44 |
| 5,317,836 | 6/1994 | Hasegawa et al. | 451/254 |
| 5,538,463 | 7/1996 | Hasegawa et al. | 451/6 |
| 5,609,514 | 3/1997 | Yasunaga et al. | 451/44 |
| 5,625,446 | 4/1997 | Bedard | 451/6 |

FOREIGN PATENT DOCUMENTS

| | | | |
|---|---|---|---|
| 58-168-129 | 11/1983 | Japan . | |
| 59-214554 | 12/1984 | Japan . | |
| 2-131868 | 5/1990 | Japan . | |
| 2-74157 | 6/1990 | Japan . | |
| 401020958 | 3/1994 | Japan | 451/44 |
| 6-76280 | 3/1994 | Japan . | |
| 6-218670 | 8/1994 | Japan . | |
| 90008012 | 7/1990 | WIPO | 451/6 |

*Primary Examiner*—Robert A. Rose
*Assistant Examiner*—George Nguyen
*Attorney, Agent, or Firm*—Oblon, Spivak, McClelland, Maier & Neustadt, P.C.

[57] ABSTRACT

A substrate inner/outer edge chamfering machine set for chamfering the outer and inner edges of substrates is shown, and includes inner and outer chamfering machines 11 with grinding wheels for chamfering the inner and outer edges, respectively, of each substrate. A measuring unit 12 successively measures the chamfer length of substrates worked by the inner and outer chamfering machines, and a measurement data processing unit 13 calculates the correction amount with respect to a grinding wheel feed amount according to measurement results from the measuring unit. A control unit 14 controls the operation of the inner and outer edge chamfering machines and corrects the grinding wheel feed amount according to the correction amount from the measurement data processing unit.

12 Claims, 14 Drawing Sheets

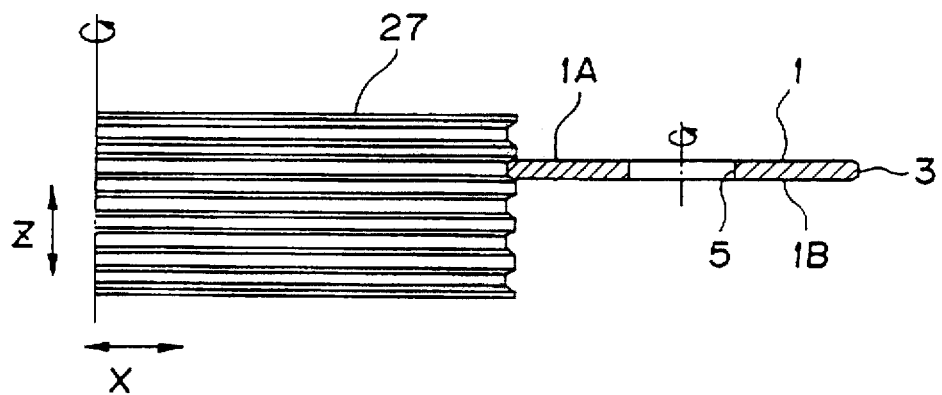
FIG. 5A
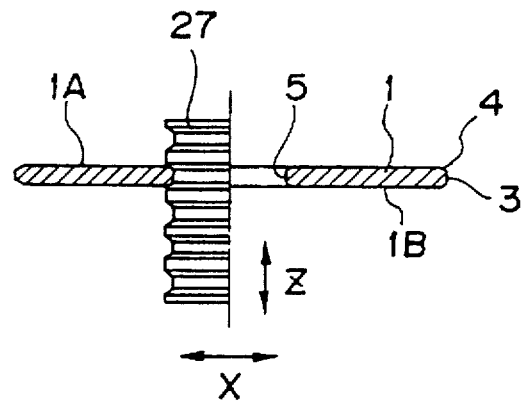
FIG. 5B
FIG. 6
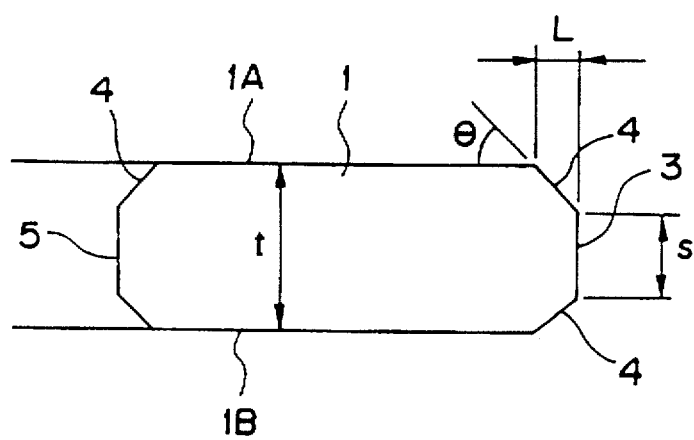

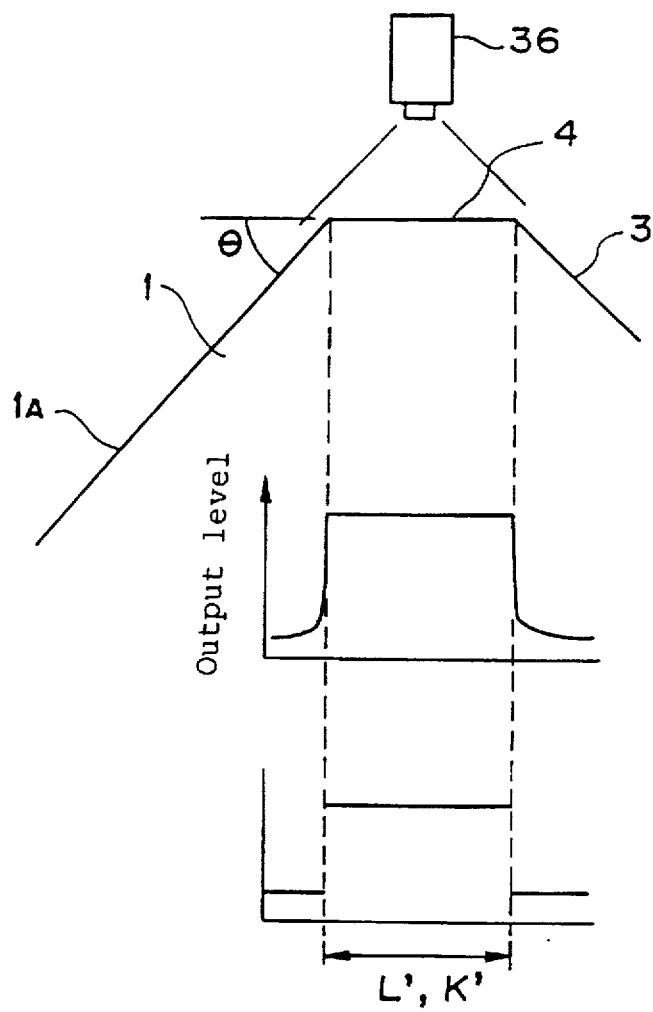

FIG. 17A PRIOR ART
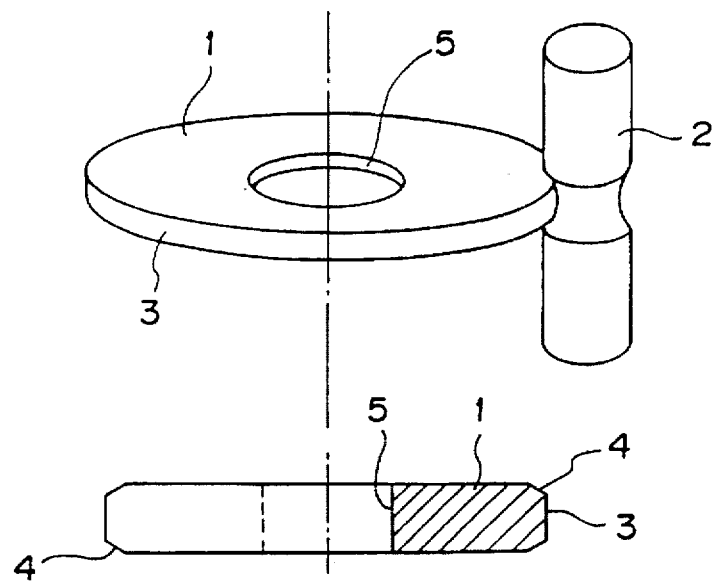
FIG. 17B PRIOR ART
FIG. 18A PRIOR ART
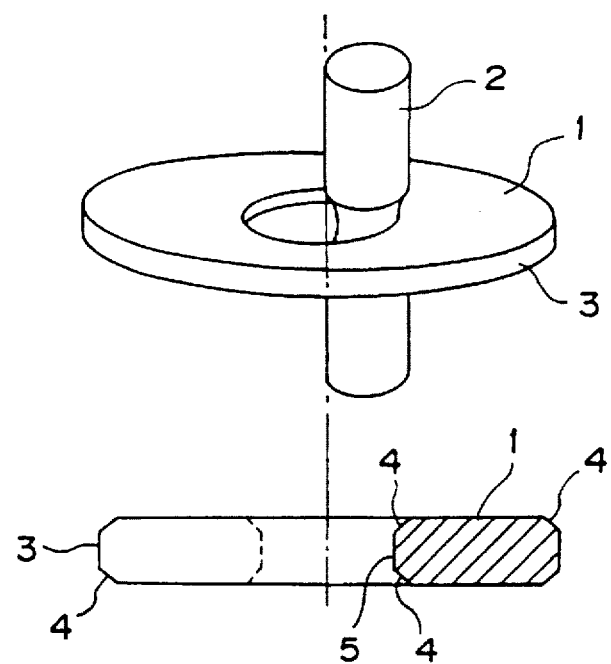
FIG. 18B PRIOR ART

SUBSTRATE CHAMFERING MACHINE

FILED OF THE INVENTION

This invention relates to a substrate chamfering machine for chamfering an end face of a substrate used for a hard disc, for instance.

BACKGROUND OF THE INVNETION

A substrate 1 (FIG. 17) used for a hard disc, has its outer and inner edges machined before or after its front and rear surfaces are polished. Specifically, its outer edge 3 is ground and formed with chamfers 4 by the grinding wheel 2 of an inner/outer edge grinding/chamfering machine, as shown in FIG. 17(A). Also, its inner edge 5 is ground and formed with chamfers 4 by the grinding wheel 2, as shown in FIG. 18(B). The chamfers 4 thus formed are necessary for preventing damage to the edges 3 and 5 of the substrate 1.

As shown in FIG. 20(A), the length (or chamfer lengths L and K) of the chamfers 4 of the substrate 1 should be set in a predetermined range, and substrates 1 having chamfer lengths L and K outside this range are discarded.

In the above inner/outer edge grinding/chamfering machine, however, as shown in FIG. 19, a shaft 7 coupling the grinding wheel 2 and a drive motor 6 is subject to axial expansion in proportion to the machining time due to heat generated from the grinding wheel 2 and also from the drive motor 6 during machining. In such a case, the center 8 of the grinding wheel 2 may be deviated from the center 9 of the substrate 1, producing a deviation Δ as shown in FIGS. 20(B) and 21. Thus, the chamfer length L and K is liable to be outside the predetermined range.

Accordingly, during operation of the inner/outer edge grinding/chamfering machine, the operator thereof always measures the chamfer lengths L and K of the substrate 1 having been machined by removing the substrate 1, calculating or determining the deviation Δ of the grinding wheel center 8 from the substrate center 9 from the measured chamfer lengths L and K, and correcting the rate of axial feed (feed in Z directions in FIG. 19) of the grinding wheel 2 utilizing the deviation Δ as a correction amount.

The measurement of the chamfer lengths L and K of the substrate 1 and the correction of the rate of axial feed of the grinding wheel 2 by the operator, is always necessary when starting the machine or when changing stages of the grinding wheel 2 in use. However, the chamfer lengths L and K of the substrate 1 may not be adequately controlled in the event of measurement errors or correction amount calculation errors.

DISCLOSURE OF THE INVNETION

The present invention was made in view of the above affairs, and it has an object of providing a substrate chamfering machine, which permits the chamfer length of chamfers in the outer and inner edge surfaces of the substrate to always be maintained adequately without requiting manual operation.

The invention as set forth in claim 1 provides a substrate chamfering machine for chamfering a substrate edge, and includes a chamfering machine including a grinding wheel for chamfering the substrate edge. A measuring unit successively measures the chamfer length of substrates worked by the chamfering machine, and a measurement data processing unit calculates the correction amount with respect to the feed amount of the grinding wheel according to the measuring result of the measuring unit. In addition, a control unit controls the operation of the chamfering machine and corrects the feed amount of the grinding wheel according to the correction amount from the measurement data processing unit.

Another feature of the invention as set forth in claim 2 resides in the substrate chamfering machine as set forth in claim 1, in which the measuring unit measures the chamfer length from the side of the front or back surface of the substrate.

A further feature of the invention as set forth in claim 3 resides in the substrate chamfering machine as set forth in claim 1 or 2, in which the measuring unit includes a camera for picking up the chamfer length of the substrate. An image processing unit digitally converts an image picked up by the camera and processes the resultant digital data to determine the chamfer length.

A still further feature of the invention as set forth in claim 4 resides in the substrate chamfering machine as set forth in one of claims 1 to 3, in which the measurement data processing unit judges whether the measured chamfer length is adequate and, if inadequate, outputs a discarding signal. The control unit then controls the chamfering machine according to the discarding signal to cause any inadequate chamfer length substrate to be discarded to the outside of the machine.

A further feature of the invention as set forth in claim 5 resides in the substrate chamfering machine as set forth in one of claims 1 to 4, in which the substrate is made of a non-metallic material.

Another feature of the invention as set forth in claim 6 resides in the substrate chamfering machine as set forth in claim 5, in which the substrate is made of a glass like carbon material.

According to the invention, 1 the following functions ① to ③ are provided.

① The measuring unit successively measures the chamfer length of substrates worked by the chamfering machine, and the measurement data processing unit computes the correction amount with respect to the feed amount of the grinding wheel in the chamfering machine according to the measured value of the chamfer length. In addition, the control unit corrects and controls the feed amount of the grinding wheel in the chamfering machine according to the correction amount. The chamfer length of the substrate thus can always be held adequately without need of manual operation (by the operator). In particular, it is possible to produce adequate chamfer length substrates at the time the chamfering machine is started, or when the working stage of the multiple stage grinding wheel is changed.

② The measurement data processing unit outputs the discarding signal when the chamfer length of the substrate measured by the measuring unit is inadequate, and the control unit causes the inadequate chamfer length substrate to be discarded through control of the chamfering machine according to the discarding signal. The selection of substrates as to the adequacy of the chamfer length thus can be adequately achieved without requiring manual operation.

③ Since the substrate is made of a non-metallic material, it is possible to grind and chamfer, at the same time, the inner and outer edges of a substrate to predetermined sizes with the grinding wheels. Thus, for substrates made of a non-metallic fragile material, it is possible to efficiently grind and chamfer the substrate edges.

BRIEF DESCRIPTION OF THE DRAWINGS

FIG. 5 is a view illustrating the grinding operation of a multiple stage grinding wheel in the substrate inner/outer edge grinding/chamfering machine shown in FIG. 2;

FIG. 6 is a fragmentary sectional view showing a part of the substrate machined by the substrate inner/outer edge grinding/chamfering machine shown in FIG. 2;

FIG. 16 is a view illustrating a modification of the chamfer length measurement by the measuring unit;

FIG. 17 is a view illustrating outer edge grinding and chamfering by a prior art substrate inner/outer edge grinding/chamfering machine;

FIG. 18 is a view illustrating inner edge grinding and chamfering by the prior art substrate inner/outer edge grinding/chamfering machine;

BEST PRACTICAL MODES OF THE INVENTION

Figure 1:
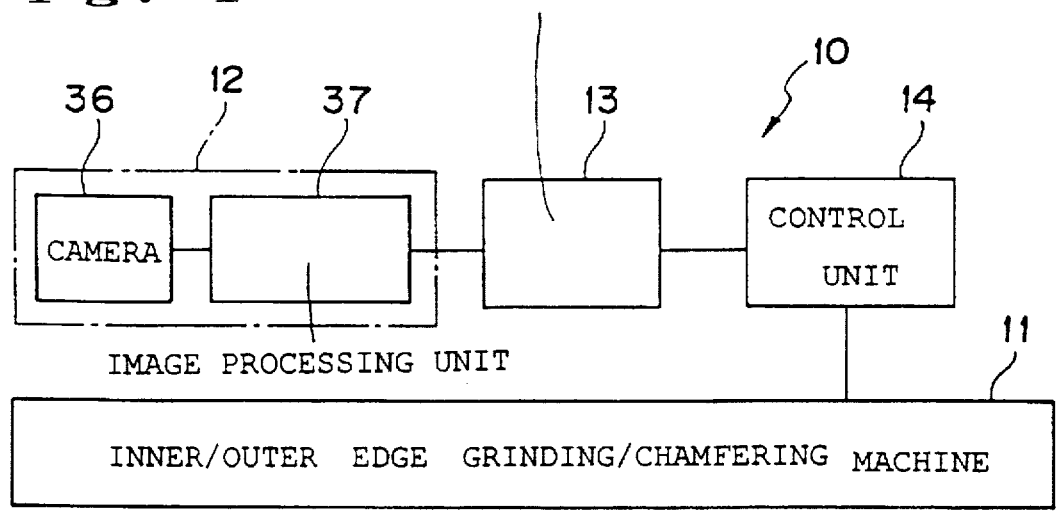
FIG. 1 is a block diagram showing a substrate inner/outer edge grinding/chamfering machine according to a first embodiment of the substrate chamfering machine of invention.

Preferred embodiments of the invention will now be described with reference to the accompanying drawings.

(First Embodiment)

A first embodiment of the invention will now be described. Parts corresponding to those in the prior art described earlier are designated by the same reference numerals, and their description is omitted.

FIG. 1 schematically depicts a substrate inner/outer edge grinding/chamfering machine set 10 as the substrate chamfering machine. The machine set 10 includes an inner/outer edge grinding/chamfering machine 11 for grinding the outer and inner edges 3 and 5 of a substrate 1 and for forming chamfers 4. In addition, a measuring unit 12 measures the chamfers 4 of the substrate 1, and a measurement data processing unit 13 processes measurement data from the measuring unit 12. Further, a control unit 14 controls the inner/outer edge grinding/chamfering machine 11.

Figure 2:
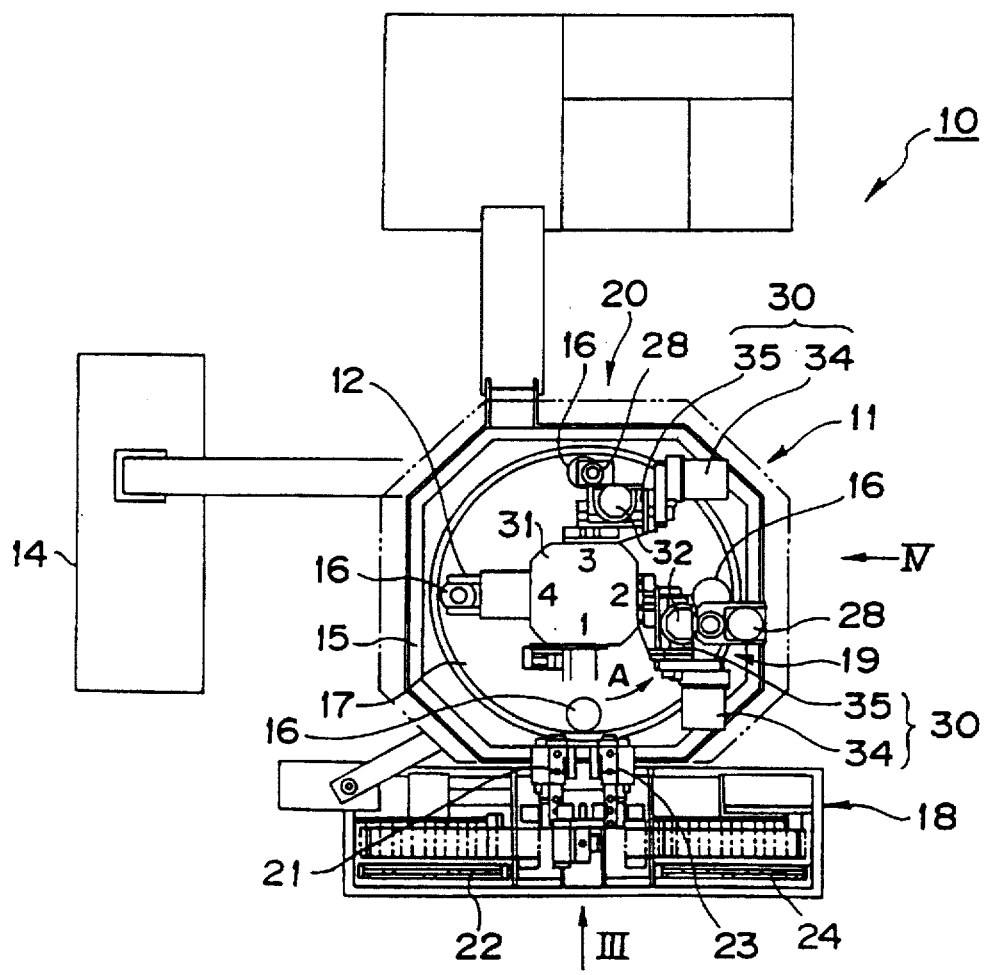
FIG. 2 is a plan view showing the substrate inner/outer edge grinding/chamfering machine shown in FIG. 1.
Figure 3:
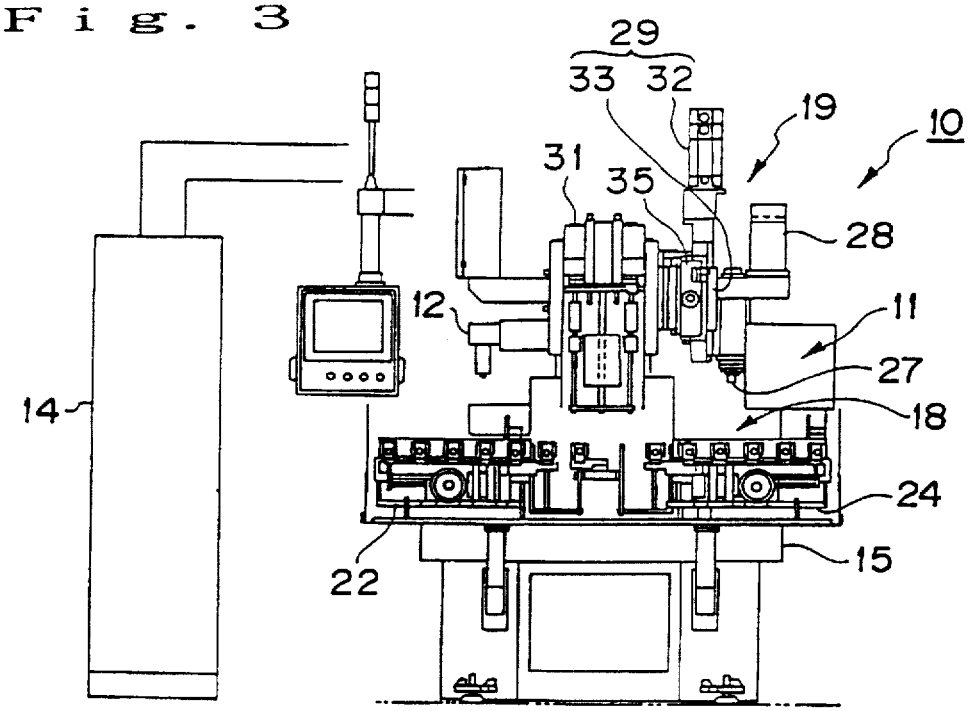
FIG. 3 is a view taken in the direction of arrow III in FIG. 2.
Figure 4:
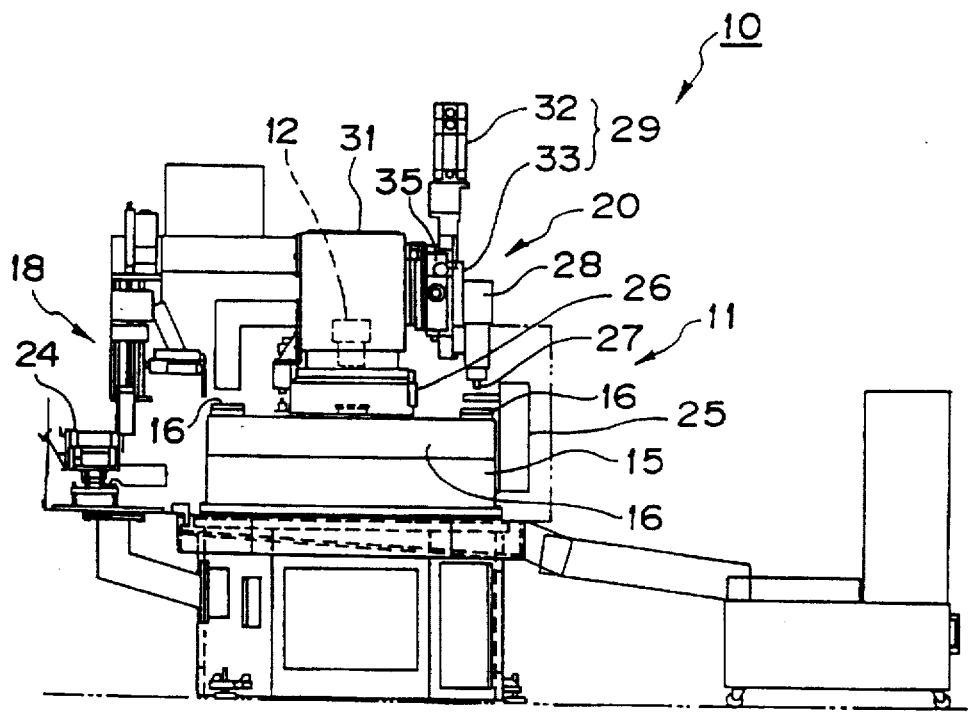
FIG. 4 is a view taken in the direction of arrow IV in FIG. 2.

FIGS. 2 to 4 show the inner/outer edge grinding/chamfering machine 11. As shown, the machine 11 includes a turntable 17, which is installed on a machine bed 15, and has four, uniformly spaced-apart substrate supports 16. The turntable 17 is rotatable in the direction of arrow A. A substrate loading/unloading unit 18, which is installed on a first stage of the machine bed 15, loads and unloads a substrate 1 to and from the substrate supports 16. An outer edge grinding/chamfering unit 19, which is installed on a second stage of the machine bed 15, grinds and forms chamfers 4 in the outer edge 3 of the substrate 1. In addition, an inner edge grinding/chamfering unit 20, which is installed on a third stage of the machine bed 15, grinds and forms chamfers 4 in the inner edge 5 of the substrate 1. The control unit 14 controls the operations of the turntable 17, substrate supplying/recovering unit 18, outer edge grinding/chamfering unit 19 and inner edge grinding/chamfering unit 20.

The substrate loading/unloading unit 18 installed on the first stage of the machine bed 15, loads a non-worked substrate 1 in a loader cassette 22 on the substrate supports 16 on the turntable 17 using a loader arm 21, and unloads the worked substrate 1 from the substrate supports 16 into an unloader cassette 24 using an unloader arm 23.

The substrate supports 16 on the turntables 17 attract the loaded substrate 1 by suction. A clamp 25 is installed on the second and third stages of the machine unit 15, and clamps the substrate 1, which is attracted to a substrate support 16, against the substrate support 16, utilizing hydraulic oil pressure to urge the clamp against the substrate 1. The first to fourth stages of the machine bed 15 have respective arrival recognition switches 26 for recognizing the arrival of the substrate supports 16 at the respective stage upon rotation of the turntable 17.

The outer and inner edge grinding/chamfering units 19 and 20 have substantially the same structure, and each includes a multiple stage grinding wheel 27 and a grinding wheel drive motor 28 for rotating the multiple stage grinding wheel 27. The multiple stage grinding wheel 27 and the drive motor 28 therefor are installed on a central column 31 on the machine bed 15 via a lifting unit 29 and a horizontal moving unit 30. The horizontal moving unit 30 has a horizontal slider 35, on which the lifting unit 29 is installed. The lifting unit 29 has a lift slider 33, on which the multiple grinding wheel 27 and the grinding wheel drive motor 28 are installed. The lifting unit 29 moves (or feeds) the lift slider 33 vertically (i.e., Z direction) with a lifting motor 32 to move (or feeds) the multiple stage grinding wheel 27 in the same direction. The horizontal moving unit 30 moves (or feeds) the horizontal slider 35 horizontally (i.e., X direction) with a horizontal moving motor 34 to move (or feed) the multiple stage grinding wheel 27 in the same direction.

The substrate 1 is made of a glass like carbon material, and the multiple stage grinding wheels 27 grind and, at the same time, form chamfers 4 in the outer and inner edges 3 and 5, respectively, of the substrate 1. The multiple stage grinding wheel 27 as shown in FIG. 5(A), has multiple working stages each for grinding and, at the same time, forming chamfers 4 (FIG. 6) in the outer edge 3 of the substrate 1. The multiple stage grinding wheel 27 as shown in FIG. 5(B), has multiple working stages each for grinding and forming chamfers 4 (FIG. 6) in the inner edge 5 of the substrate 1.

The functions (primarily the grinding function) of the inner/outer edge grinding/chamfering machine 11 using the multiple stage grinding wheels 27, will now be described.

The control unit 14, on the first stage shown in FIG. 2, causes the worked substrate 1 on the substrate supports 16 on the turntable 17 to be unloaded into the unloader cassette 24 by the unloader arm 23, and then causes a non-worked substrate 1 in the loader cassette 22 to be loaded on and attracted to the substrate supports 16 by the loader arm 21.

Figure 8:
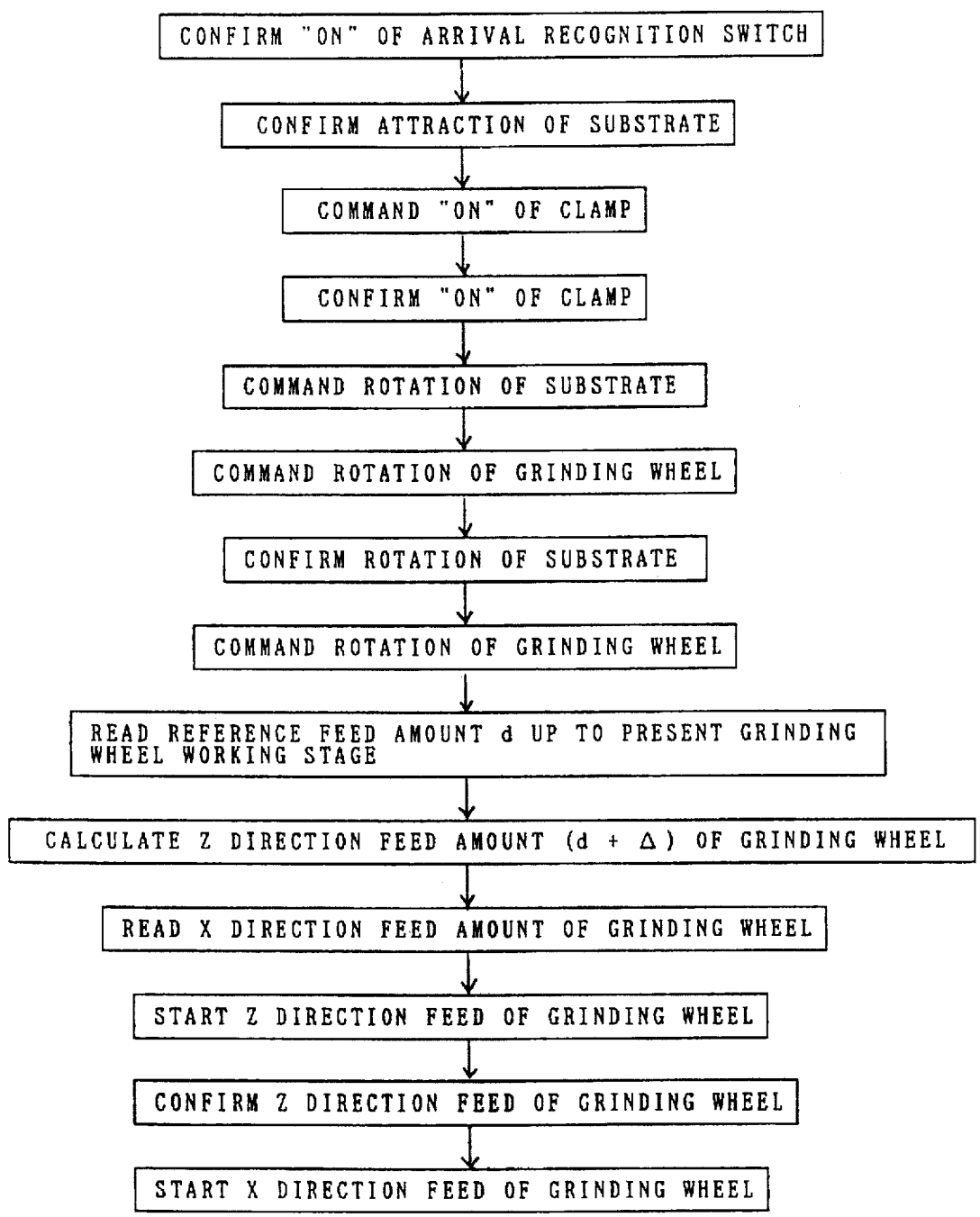
FIG. 8 is flow chart illustrating grinding control by a control unit shown in FIGS. 1 and 2.

The control unit 14 then causes a 90-degree rotation of the turn-table 17 to bring the substrate supports 16 supporting the non-worked substrate 1 to the second stage. Then, as shown in FIG. 8, the arrival recognition switch 26 of this stage is turned on for recognition of this position. The control unit 14 confirms that the substrate 1 is held attracted to the substrate supports 16, then operates the clamp 25, and then confirms that the substrate 1 is clamped by the clamp 25.

The control unit 14 then causes rotation of the substrate 1 via the substrate supports 16, and also causes rotation of the multiple stage grinding wheel 27 in the outer edge grinding/chamfering unit 19 by the grinding wheel drive motor 28. The control unit 14 confirms the rotation of the substrate 1 and the multiple stage grinding wheel 27, then reads out a Z direction feed amount d of the multiple stage grinding wheel 27 up to the present working stage, calculates a Z direction feed amount (d+Δ) of the multiple stage grinding wheel 27 from correction amount Δ to be described later, and reads out an X direction feed amount of the multiple stage grinding wheel 27. The control unit 14 then moves the multiple stage grinding wheel 27 by the feed amount (d+Δ) in the Z direction and also by a predetermined amount in the X direction. The control unit 14 thus causes grinding and formation of chamfers 4 in the outer edge 3 of the substrate 1.

Subsequently, the control unit 14 causes a 90-degree rotation of the turntable 17 to bring the substrate 1, after the grinding and formation of the chamfers 4 in the outer edge 3, to the third stage. The control unit recognizes this position with the arrival recognition switch 26, and causes the substrate 1 to be attracted to the substrate supports 16 and clamped by the clamp 25. The control unit then causes the grinding and at the same time the formation of chamfers 4 in the inner edge 5 of the substrate with the multiple stage grinding wheel 27 in the inner edge grinding/chamfering unit 20 as in the case with the outer edge grinding/chamfering unit 19.

Figure 7:
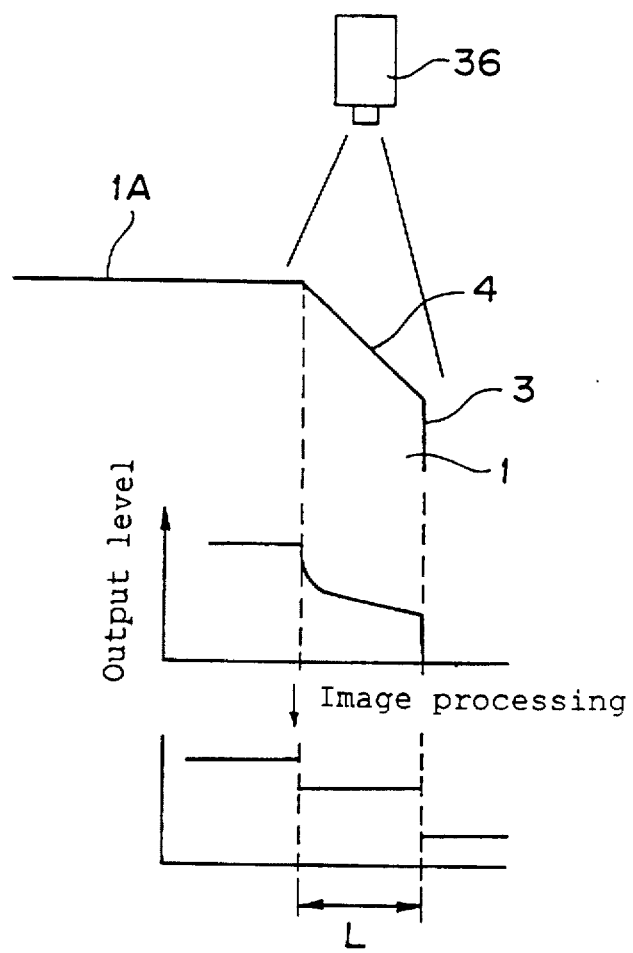
FIG. 7 is a view illustrating the operation of chamfer length measurement by a measuring unit shown in FIGS. 1 and 2.

As shown in FIGS. 1 to 4, the measuring unit 12 installed on the fourth stage of the machine bed 15, measures the chamfer length L of chamfer 4 of the substrate 1, as shown in FIG. 6. The measuring unit 12 has a camera 36 and an image processing unit 37. The camera 36 has an enlarging or polarizing lens with a large depth-of-focus. As shown in FIG. 7, the camera 36 picks up the chamfer length L in a direction perpendicular to the surface 1A of the substrate 1. The image processing unit 37 digitally converts the image picked up by the camera 36 and processes the resultant digital data, thus determining the chamfer length L. The camera 36 may measure the chamfer length L from a direction perpendicular to the back surface 1B of the substrate 1 as well.

The worked substrate 1, after measurement of the chamfer length L, is returned to the first stage of the machine bed 15 with a 90-degree rotation of the turn-table 17 under the control of the control unit 14, and is either unloaded by the unloader arm 23 of the loading/unloading unit 18 into the unloader cassette 24 or is discarded as will be described later.

The measurement data processing unit 13 noted above, as shown in FIG. 1, is electrically connected to the image processing unit 37 of the measuring unit 12. The measurement data processing unit 13 calculates the correction amount Δ with respect to the Z direction feed amount of each of the multiple stage grinding wheels 27 in the outer and inner edge grinding/chamfering units 19 and 20 from the chamfer lengths L of the chamfer 4 in the outer and inner edges 3 and 5 of the substrate 1 as measured by the measuring unit 12. The measurement data processing unit also judges whether the chamfer lengths L are satisfactory. In the following, the calculation of the correction amount Δ with respect to the Z direction feed amount of the multiple stage grinding wheel 27 in the outer edge grinding/chamfering unit 19 from the chamfer length L of the chamfer 4 in the outer edge 3 and the judgment of the chamfer length L will be typically described.

Figure 9:
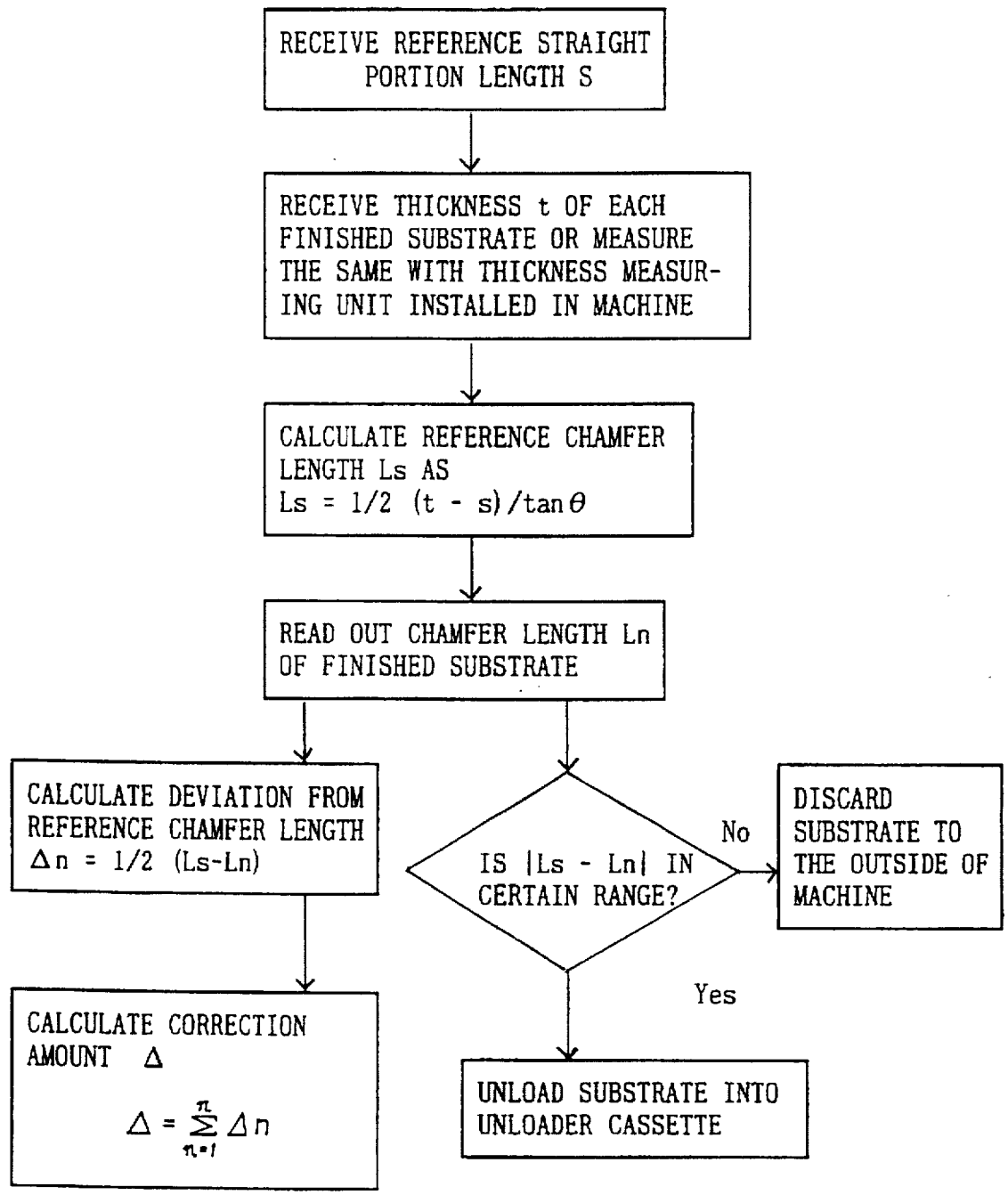
FIG. 9 is a flow chart illustrating processing by a measurement data processing unit shown in FIGS. 1 and 2.

As shown in FIGS. 6 and 9, the processing unit 13 receives the reference straight portion length s and chamfer angle θ of the outer edge 3 of the substrate 1, and calculates the reference chamfer length Ls using equation (1) and by receiving or actually measuring the thickness t of the substrate 1.

$$Ls = \tfrac{1}{2}(t-s)/\tan\theta \qquad (1)$$

The measurement data processing unit 13 successively reads out chamfer lengths Ln of worked substrates 1 successively brought to the fourth stage of the machine bed 15 as successively measured by the measuring unit 12. Represented by n is the number of substrates 1 that have been ground up to a certain time instant by one of the working stages of the multiple stage grinding wheel 27. When the absolute value of the difference between each read-out chamfer length Ln and the reference chamfer length Ls is in a predetermined range, the measurement data processing unit 13 judges that the read-out chamfer length Ln is adequate, and otherwise it judges the read-out chamfer length Ln to be inadequate and outputs a discarding signal α. The result of judgment is output to the control unit 14. The control unit 14, as described above, causes the substrate 1 with adequate chamfer length Ln to be unloaded into the iunloader cassette 24 via the Loading/unloading unit 18 while discarding the substrate 1 with inadequate chamfer length Ln according to the discarding signal α.

The measurement data processing unit 13 further calculates the deviation Δn of each measured chamfer length Ln from the reference chamfer length Ls by using equation (2), and computes the correction amount Δ with respect to the Z direction feed amount of the multiple stage grinding wheel 27 in the outer edge grinding/chamfering unit 19 by summing up the deviations Δn of the substrates 1 that have been ground up to that time by one of the working stages of the multiple stage grinding wheel 27 by using equation (3).

$$\Delta n = (Ls - Ln) \quad (2)$$

$$\Delta = \sum_{n=1}^{n} \frac{1}{2} \Delta n \quad (3)$$

As described before, the control unit 14 receives the computed correction amount Δ, and calculates the Z direction feed amount (d+Δ) of the multiple stage grinding wheel 27.

The above embodiment can provide the following effects ① to ③.

① The measuring unit 12 successively measures the chamfer length Ln of substrates 1 worked by the inner/outer edge grinding/chamfering machine 11, and the measurement data processing unit 13 calculates the correction amount Δ with respect to the feed amount of the grinding wheels 27 in the outer and inner edge grinding/chamfering units 19 and 20 in the inner/outer edge grinding/chamfering machine 11 according to the measured chamfer length Ln. The control unit 14 corrects the feed amount d of the multiple stage grinding wheels 27 in the outer and inner edge grinding/chamfering units 19 and 20 of the inner/outer edge grinding/chamfering machine 11 according to the correction amount Δ. It is thus possible to always maintain an adequate chamfer length L of the substrate 1 without requiring manual operation. In particular, it is possible to obtain adequate chamfer length substrates 1 having an adequate chamfer length L upon starting of the substrate inner/outer edge grinding/chamfering machine set 10 or upon changing of the present working stage of the multiple stage grinding wheels 27.

② When the chamfer length L of the substrate 1 measured by the measuring unit 12 is inadequate, the measurement data processing unit 13 outputs the discarding signal α, and the control unit 14 controls the inner/outer edge grinding/chamfering machine 11 according to the discarding signal α to discard the substrate 1 with the inadequate chamfer length L. Thus, the selection of substrates 1 with respect to the adequacy of the chamfer length L can be made without requiring manual operation.

③ Since the substrate 1 is made of a fragile glass like carbon material, the multiple stage grinding wheels 27 in the outer and inner edge grinding/chamfering units 19 and 20 can grind and, at the same time, form chamfers 4 in the outer and inner edges 3 and 5 of the substrate 1. It is thus possible to obtain efficient formation of the chamfers 4 in the outer and inner edges 3 and 5 of the substrate 1.

(Second Embodiment)

Figure 10:
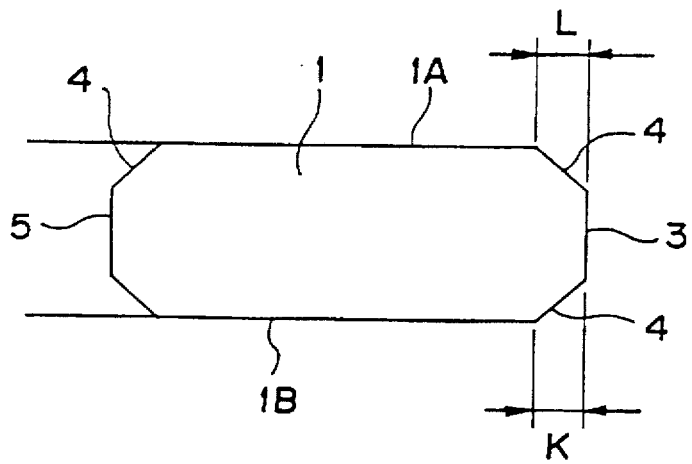
FIG. 10 is a fragmentary sectional view showing a substrate with chamfer lengths measured in a substrate inner/outer edge grinding/chamfering machine according to a second embodiment of the substrate chamfering machine of the invention.
Figure 11:
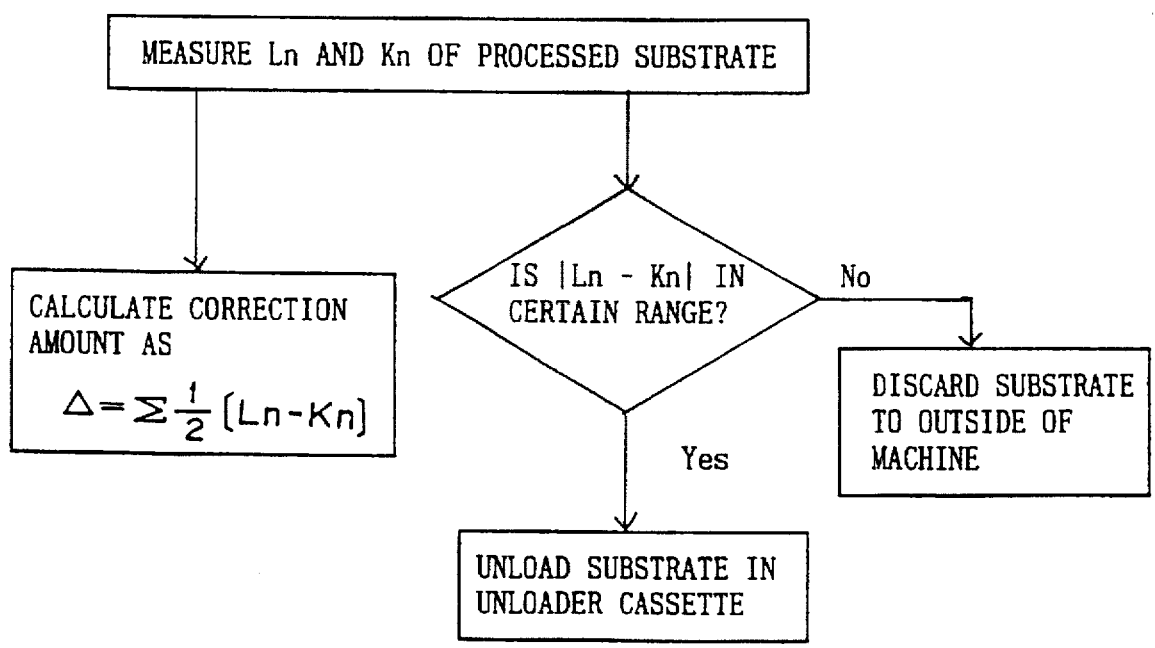
FIG. 11 is a flow chart showing illustrating processing by a measurement data processing unit in the second embodiment shown in FIG. 10.

FIG. 10 is a fragmentary sectional view showing a substrate with a chamfer length which is measured in a substrate inner/outer edge grinding/chamfering machine set according to a second embodiment of the substrate grinding/chamfering machine set of the invention. FIG. 11 is a flow chart illustrating operation of a measurement data processing unit in the second embodiment shown in FIG. 10. In the second embodiment, parts corresponding to those in the first embodiment are designated by like reference numerals, and their description is omitted.

In this second embodiment of the substrate inner/outer edge grinding/chamfering machine set 10, the measuring unit 12 measures the chamfer length L of chamfers 4 on the side of the front surface 1A of the substrate 1 in a direction perpendicular to the surface 1A of the substrate 1. The measuring unit also measures the chamfer length K of chamfers 4 on the side of the back surface 1B in a direction perpendicular thereto.

As shown in FIG. 11, the measurement data processing unit 13 does not calculate the reference chamfer length Ls in advance. Instead, the unit 13 determines the chamfer lengths Ln and Kn successively measured in the measuring unit 12 to be adequate when the absolute value of the difference between Ln and Kn is in a predetermined range, while otherwise determining Ln and Kn to be inadequate to output the discarding signal α. The measurement data processing unit 13 further calculates the correction amount Δ with respect to the Z direction feed amount of the multiple stage grinding wheels 27 in the outer and inner edge grinding/chamfering units 19 and 20 by using equation (4), and outputs the correction amount Δ to the control unit 14.

$$\Delta = \sum_{n=1}^{n} 1/2 (Ln - Kn) \quad (4)$$

Like the first embodiment, the control unit 14 controls the inner/outer edge grinding/chamfering machine 11 according to the result of the judgment by the measurement data processing unit 13 as well as the computed correction amount Δ. With the second embodiment, it is thus possible to obtain the same effects as obtainable with the first embodiment.

(Third Embodiment)

Figure 12A:
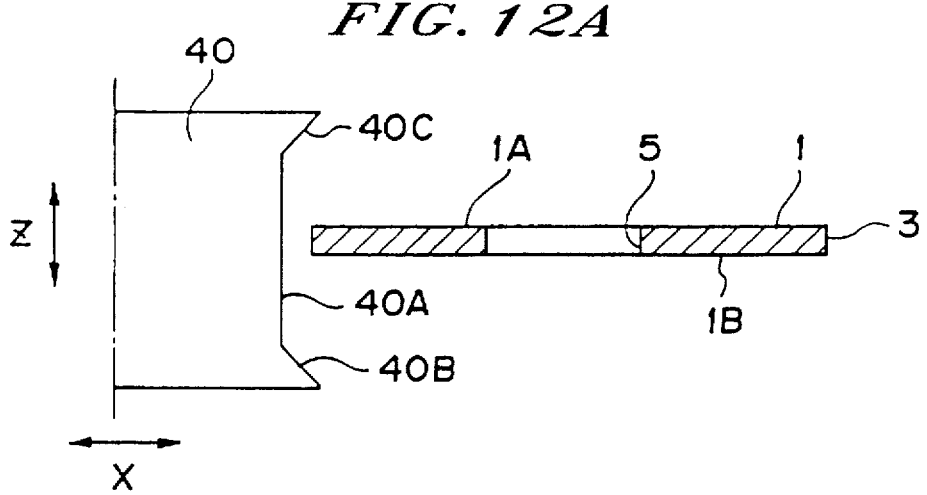
FIG. 12 is a view illustrating grinding operation by a single stage grinding wheel in a substrate inner/outer edge grinding/chamfering machine according to a third embodiment of the substrate chamfering machine of the invention.
Figure 12B:
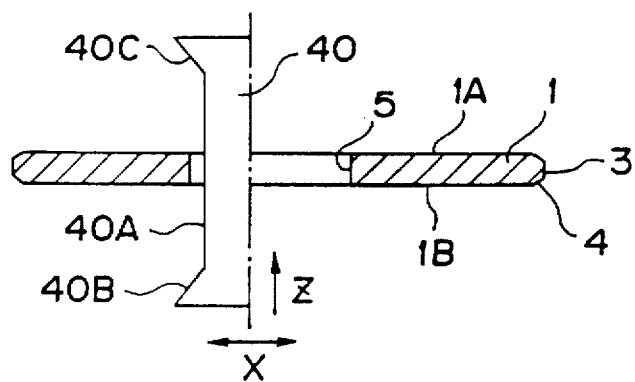
Figure 13:
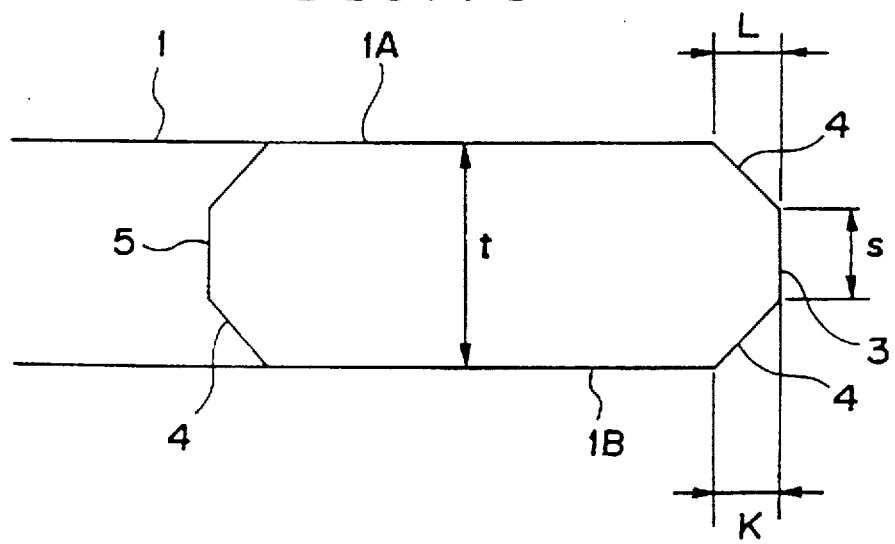
FIG. 13 is a fragmentary sectional view showing a substrate with chamfer lengths measured in the third embodiment shown in FIG. 12.
Figure 14:
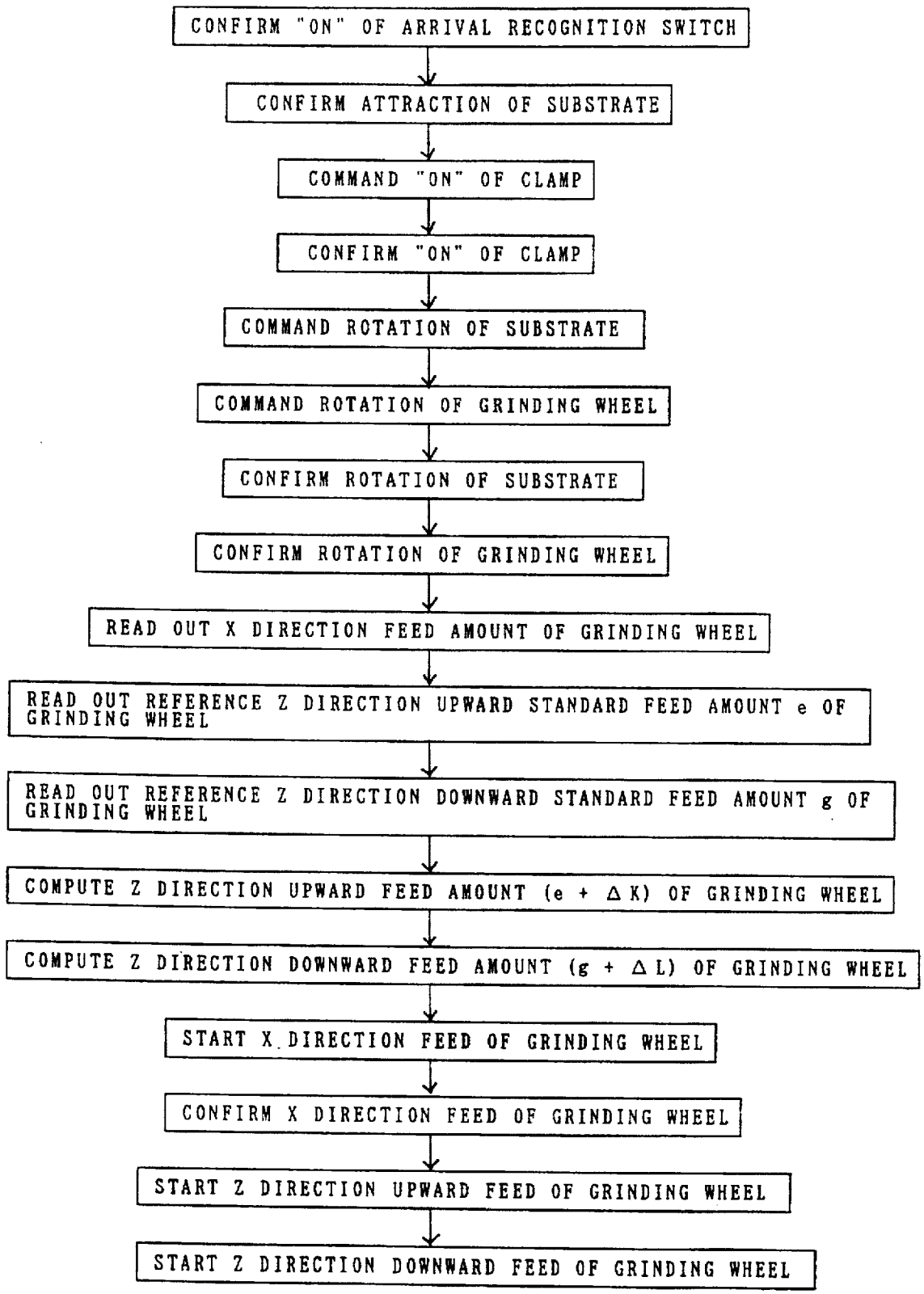
FIG. 14 is a flow chart illustrating grinding control by a control unit in the third embodiment shown in FIG. 12.
Figure 15:
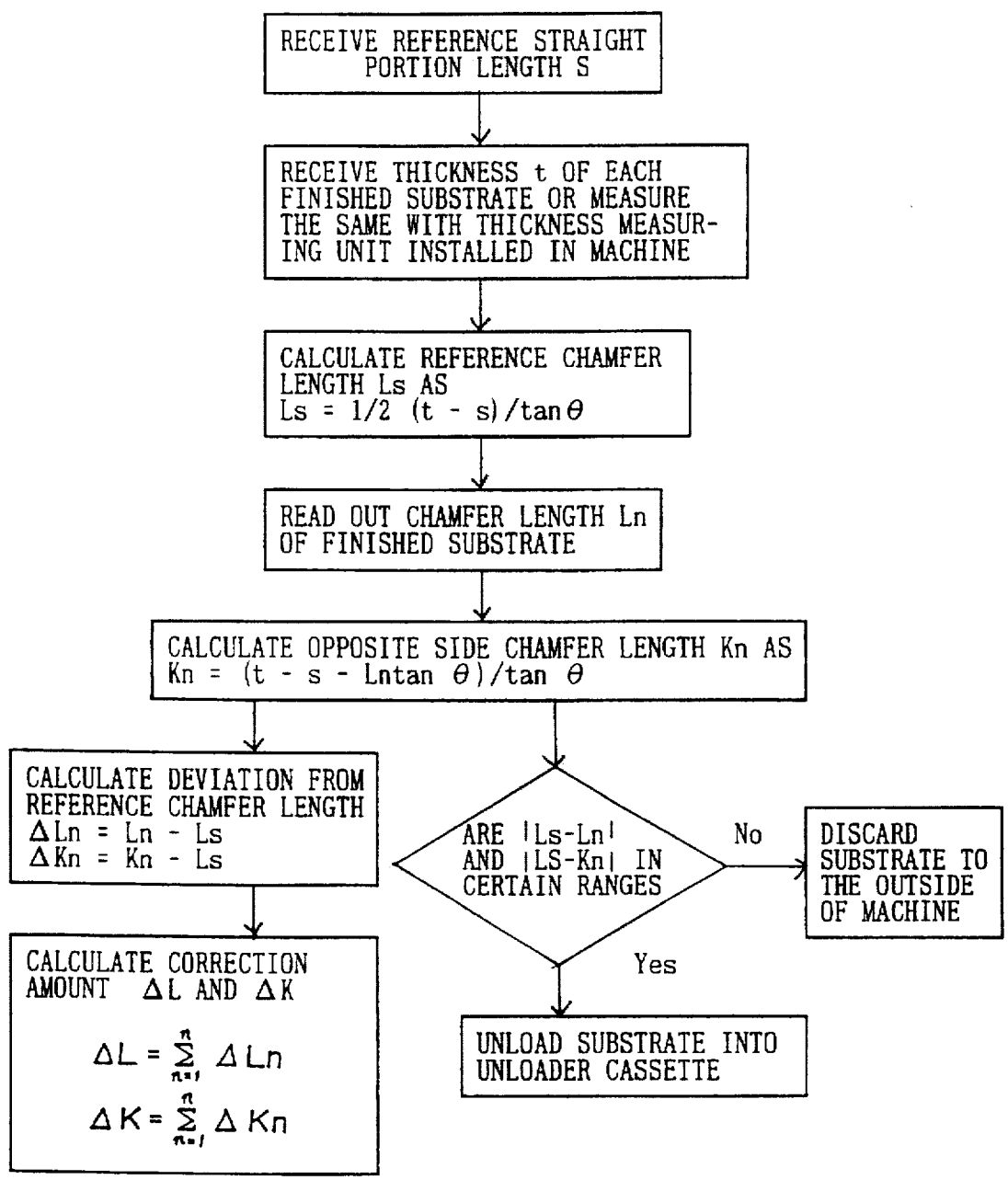
FIG. 15 is a flow chart illustrating processing by a measurement data processing unit in the third embodiment shown in FIG. 12.
Figure 19:
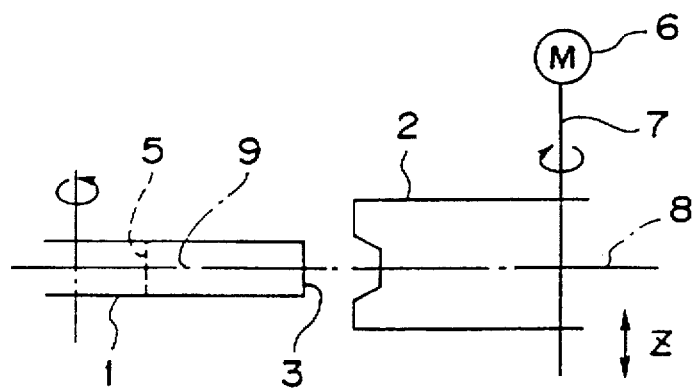
FIG. 19 is a view showing the positional relation between grinding wheel and substrate in the outer edge grinding and chamfering operation in the prior art substrate inner/outer edge grinding/chamfering machine;.
Figure 20A:
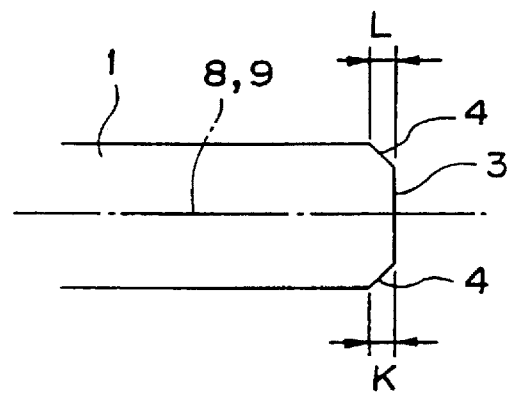
FIG. 20 is a fragmentary sectional view showing substrate portions having been machined by the prior are substrate inner/outer edge grinding/chamfering machine.
Figure 20B:
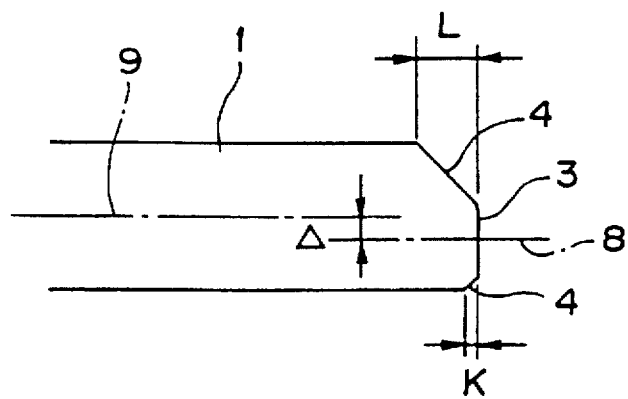
Figure 21:
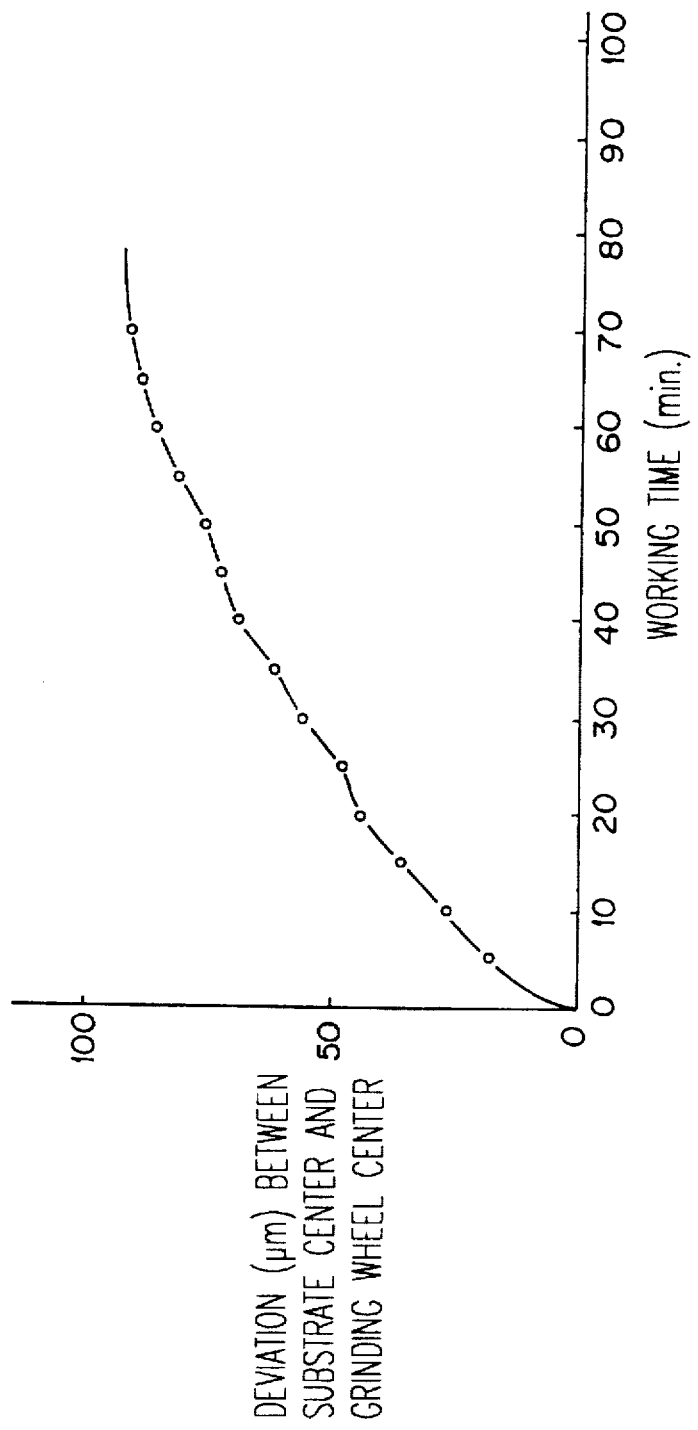
FIG. 21 is a graph showing the relation between the deviation between grinding wheel center and substrate center and grinding time in the prior art substrate inner/outer edge grinding/chamfering machine.

FIG. 12 is a view illustrating a grinding operation of single stage grinding wheels in a substrate inner/outer edge grinding/chamfering machine according to the third embodiment of the substrate chamfering machine set of the invention. FIG. 13 is a fragmentary sectional view showing a substrate with a chamfer length which is measured in the third embodiment shown in FIG. 12. FIG. 14 is a flow chart illustrating a grinding operation which is controlled by a control unit in the third embodiment shown in FIG. 12. FIG. 15 is a flow chart illustrating a processing operation of a measurement data processing unit in the third embodiment shown in FIG. 12.

In this third embodiment, parts corresponding to those in the first embodiment are designated by like reference numerals, and their description is omitted.

In this third embodiment of the substrate inner/outer edge chamfering machine set 10, the outer and inner edge grinding/chamfering units 19 and 20 in the inner/outer edge grinding/chamfering machine 11 use single stage grinding wheels 40.

With the use of the single stage grinding wheels 40, the control unit 14, as will be described later in detail, causes the single stage grinding wheels 40 in the outer and inner edge grinding/chamfering units 19 and 20 to be fed forward in the X direction toward the substrate 1. The outer and inner edges 3 and 5 of the substrate 1 are thus ground by the vertical peripheral surfaces 40A of the single stage grinding wheels 40. Subsequently, the control unit 14 causes the single stage grinding wheels 40 to be retreated slightly in the X direction and then fed upward in the Z direction. As a result, chamfers 4 are formed in the back surface 1B of the substrate 1 by lower tapered faces 40B of the single stage grinding wheels 40. Then, the single stage grinding wheels 40 are fed downward in the Z direction, whereby chamfers are formed on the side of the surface 1A of the substrate 1 by upper tapered faces 40C of the single stage grinding wheels 40. The single stage grinding wheels 40 are retreated in X direction before formation of the chamfers 4 in order to prevent excessive loads from being applied to the boundaries between the vertical periphery 40A of each of the single stage grinding wheels 40 and the upper and lower tapered surfaces 40B and 40C.

As shown in FIG. 13, the measuring unit 12 measures the chamfer length L of the chamfers 4 on the side of the surface 1A of the substrate 1. The measuring unit 12 may measure the chamfer lengths L and K of the chamfers 4 in both the front and back surfaces 1A and 1B of the substrate 1.

As shown in FIG. 15, the measurement data processing unit 13, like the measurement data processing unit 13 in the first embodiment, calculates the reference chamfer length Ls in advance. In case the measuring unit 12 measures the sole chamfer length Ln on the side of the front surface 1A of the substrate 1, the measurement data processing unit 13 obtains the chamfer length Kn of the chamfers 4 on the side of the back surface 1B using equation (5). In case the measuring unit 12 measures the chamfer length Kn on the side of the back surface 1B of the substrate 1 as well, the measured chamfer length Kn is used.

$$KN = (t-s-Ln \tan \theta)/\tan \theta \quad (5)$$

When it is determined by the measurement data processing unit 13 that the absolute value of the difference between the reference chamfer length Ls and the front surface side chamfer length Ln and the absolute value of the difference between the reference chamfer length Ls and the back surface side chamfer length Kn are both in a certain acceptable range, the control unit 14 causes the substrate 1 with these chamfers 4 to be unloaded into the unloader cassette 24 by operating the unloader arm 23. When one of the two absolute values is outside of the acceptable range, the discarding signal α is outputted to the control unit 14 to cause discarding of the substrate 1 with these chamfers 4.

The measurement data processing unit 13 calculates the deviations ΔLn and ΔKn by obtaining the differences of the chamfer lengths Ln and Kn from the reference chamfer length Ls, and obtains the correction amount ΔL with respect to the Z direction downward feed amount of one single stage grinding wheel 40 at the instant when the substrate 1 is worked by the single stage grinding wheel 40 and thus obtains the correction amount ΔK with respect to the Z direction upward feed amount of the single stage grinding wheel 40 using equations (6) and (7).

$$\Delta L = \sum_{n=1}^{n} \Delta Ln \quad (6)$$

$$\Delta K = \sum_{n=1}^{n} \Delta Kn \quad (7)$$

As shown in FIG. 14, the control unit 14, like the control unit 14 in the first embodiment, confirms the position of the turntable 17 with the arrival recognition switches 26 in the second and third stages of the machine bed 15, and then confirms the attraction of the substrate 1 and the subsequent clamping thereof by the clamp 25. Then, the control unit 14 causes rotation of the substrate 1 and causes and confirms rotation of the single stage grinding wheels 40 in the outer and inner edge grinding/chamfering units 19 and 20.

Then, the control unit 14 reads out the X direction feed amount, the reference Z direction upward standard feed amount e, and the reference Z direction downward standard feed amount g of the single stage grinding wheels 40. The control unit 14 then obtains the Z direction upward and downward feed amounts (e+ΔK) and (g+ΔK) of the single stage grinding wheels 40, which are obtained by correcting the reference Z direction upward and downward feed amounts e and g by adding the correction amounts ΔK and ΔL computed in the measurement data processing unit 13.

The control unit 14 then feeds the single stage grinding wheels 40 in the X direction to grind the outer and inner edges 3 and 5 of the substrate 1. Then the control unit 14 causes the Z direction upward movement of the single stage grinding wheels 40 to form lower chamfers 4 in the outer and inner edges 3 and 5 of the substrate 1, and then causes the Z direction downward movement of the single stage grinding wheels 40 to form upper chamfers 4 in the outer and inner edges 3 and 5 of the substrate 1.

Again in this embodiment, like the first embodiment, the control unit 14 controls the inner/outer edge grinding/chamfering machine 11 according to the result of the judgment in the measurement data processing unit 13 and the correction amounts ΔL and ΔK computed therein. Thus, with this third embodiment the same effects as obtainable with the first embodiment can be achieved.

In the above embodiments the chamfer lengths L and K were measured directly by the camera 36 in the measuring unit 12 in a direction perpendicular to the front and back surfaces 1A and 1B of the substrate 1. As shown in FIG. 16, however, it is also possible to measure the actual lengths L' and K' of the chamfers 4 directly thereabove with the camera 36, to be digitally converted in the measurement data processing unit 37 in the measuring unit 12 for calculating the chamfer lengths L and K using equations (8).

$$\left. \begin{array}{l} L = L' \cos\theta \\ K = K' \cos\theta \end{array} \right\} \quad (8)$$

While in the above embodiments the substrate 1 was made of glass like carbon material, it is also possible to process substrates made of plate glass, crystallized glass or non-metallic fragile materials such as silicon.

INDUSTRIAL USABILITY

As has been described in the foregoing, the substrate chamfering machine according to the invention permits the chamfer length of chamfers formed in the outer and inner edges of substrate to always be maintained adequately without requiring manual operation.

What is claimed is:

1. A substrate chamfering machine for forming chamfers in a substrate edge comprising:
   a chamfering machine including a grinding wheel for chamfering the substrate edge;
   a measuring unit for successively measuring a chamfer length of substrates worked by the chamfering machine;
   a measurement data processing unit for calculating a correction amount with respect to a feed amount of the grinding wheel according to the measuring result of the measuring unit; and
   a control unit for controlling the operation of the chamfering machine and correcting the feed amount of the grinding wheel according to the correction amount calculated by the measurement data processing unit.

2. The substrate chamfering machine according to claim 1, wherein the measuring unit measures the chamfer length from the side of the front or back surface of the substrate.

3. The substrate chamfering machine according to claim 1, wherein the measuring unit includes a camera for picking up the chamfer length of the substrate and an image processing unit for digitally converting an image picked up by the camera and processing the resultant digital data to determine the chamfer length.

4. The substrate chamfering machine according to claim 1, wherein the measurement data processing unit judges whether the measured chamfer length is adequate and, if inadequate, outputs a discarding signal, and the control unit controls the chamfering machine according to the discarding signal to cause any inadequate chamfer length substrate to be discarded to the outside of the machine.

5. The substrate chamfering machine according to claim 1, wherein the substrate is made of a non-metallic material.

6. The substrate chamfering machine according to claim 5, wherein the substrate is made of a glass like carbon material.

7. The substrate chamfering machine according to claim 2, wherein the measuring unit includes a camera for picking up the chamfer length of the substrate and an image processing unit for digitally converting an image picked up by the camera and processing the resultant digital data to determine the chamfer length.

8. The substrate chamfering machine according to claim 2, wherein the measurement data processing unit judges whether the measured chamfer length is adequate and, if inadequate, outputs a discarding signal, and the control units controls the chamfering machine according to the discarding signal to cause any inadequate chamfer length substrate to be discarded to the outside of the machine.

9. The substrate chamfering machine according to claim 3, wherein the measurement data processing unit judges whether the measured chamfer length is adequate and, if inadequate, outputs a discarding signal, and the control units controls the chamfering machine according to the discarding signal to cause any inadequate chamfer length substrate to be discarded to the outside of the machine.

10. The substrate chamfering machine according to claim 2, wherein the substrate is made of a non-metallic material.

11. The substrate chamfering machine according to claim 3, wherein the substrate is made of a non-metallic material.

12. The substrate chamfering machine according to claim 4, wherein the substrate is made of a non-metallic material.

* * * * *